April 1, 1958 — O. K. KELLEY ET AL — 2,828,840
LIQUID COOLED FRICTION BRAKE
Filed April 28, 1955 — 7 Sheets-Sheet 1

INVENTORS
Oliver K. Kelley
Gilbert K. Hause
BY
Craig V. Morton
Attorney

Fig. 3

April 1, 1958   O. K. KELLEY ET AL   2,828,840
LIQUID COOLED FRICTION BRAKE

Filed April 28, 1955   7 Sheets-Sheet 3

Fig. 4

INVENTORS
Oliver K. Kelley
BY Gilbert K. Hause

Craig V. Morton
Attorney

INVENTORS
Oliver K. Kelley
BY Gilbert K. Hause

Craig V. Morton
Attorney

INVENTORS
Oliver K. Kelley
Gilbert K. Hause
BY
Craig V. Morton
Attorney

April 1, 1958

O. K. KELLEY ET AL

2,828,840

LIQUID COOLED FRICTION BRAKE

Filed April 28, 1955

INVENTORS
Oliver K. Kelley
BY Gilbert K. Hause

Craig V. Monton
Attorney

United States Patent Office 2,828,840
Patented Apr. 1, 1958

2,828,840

LIQUID COOLED FRICTION BRAKE

Oliver K. Kelley, Bloomfield Hills, and Gilbert K. Hause, Franklin, Mich., assignors to General Motors Corporation, Detroit, Mich., a corporation of Delaware Application April 28, 1955, Serial No. 504,528

15 Claims. (Cl. 188—264)

This invention relates to brake mechanism adapted for use on motor vehicles, and particularly to a friction brake that is liquid cooled to remove the heat generated during a brake action.

An object of the invention is to provide a brake mechanism adapted for circulation of a liquid between the stationary and movable friction elements of the brake mechanism to effect heat removal therefrom created by friction engagement of the elements caused by a brake action.

It is another object of the invention to provide a friction brake mechanism with a liquid circulating medium by which liquid is circulated between the stationary and movable friction elements of the friction brake for cooling of the friction elements during a brake action, and wherein the volume of fluid passing between the friction elements is proportioned directly to the brake energy absorbed and the heat created thereby to prevent the friction elements of the brake structure from rising beyond a predetermined temperature value.

It is another object of the invention to provide a friction brake structure having rotatable and stationary friction elements wherein a liquid circulating device is drivingly coupled with a rotatable friction brake element during the period when the rotatable friction brake element is also effecting a brake action whereby to cause the liquid circulating device to circulate liquid only during that period when energy absorption is taking place with resulting heat created in the friction elements of the brake structure.

It is still another object of the invention to provide a friction brake structure of the disk type wherein there is provided a positive displacement fluid circulating device, or pump, for circulating liquid between the friction disks of the friction brake to remove heat created by a brake action, and wherein the fluid displacement device is drivingly coupled with the friction disks of the friction brake by means of a driving disk that is engaged by the friction disks of the brakes concurrently with engagement of the friction brake disks so that the fluid circulating device is operated only during the period of brake action by the friction disks, the arrangement being such that there is no power used to drive the fluid circulating device during those periods when brake action is not required.

It is another object of the invention to provide a brake structure in accordance with the foregoing object wherein the drive disk for the fluid circulating device is included in the multiple disk assembly of the multiple disk friction brake so that the drive disk rotates at the speed of the rotatable disks of the friction brake and thereby effects liquid displacement from the pump at a volume proportioned to the speed of rotation of the rotatable brake friction disk and thus in proportion to the energy absorbed and the heat created by a brake action.

It is another object of the invention to provide a brake system for a multiple wheeled vehicle wherein each of the wheels of the vehicle includes stationary and rotatable members that provide friction brakes with each of the wheels incorporating a liquid circulating device, or pump, that individually circulates cooling liquid only through its associated friction brake so that the volume of fluid circulated by each pump through the respective friction brakes on the several wheels will be directly proportioned to the energy absorbed and heat created by the braking effort of the respective brakes at each wheel of the vehicle.

It is another object of the invention to provide a brake system incorporating the features of the foregoing object wherein the liquid circulated through the brakes of the several wheels is all delivered to a heat exchange or cooling circuit that is common to all of the liquid circulated through the severally independent friction brakes, the cooling liquid being returned to the pumps of the severally independent friction brakes for recirculation through the brakes at independently regulated flow volume according to the speed of operation of the wheels with which the several brakes are operably connected.

Further objects and advantages of the present invention will be apparent from the following description, reference being had to the accompanying drawings wherein a preferred form of the invention is clearly shown.

Figure 1:
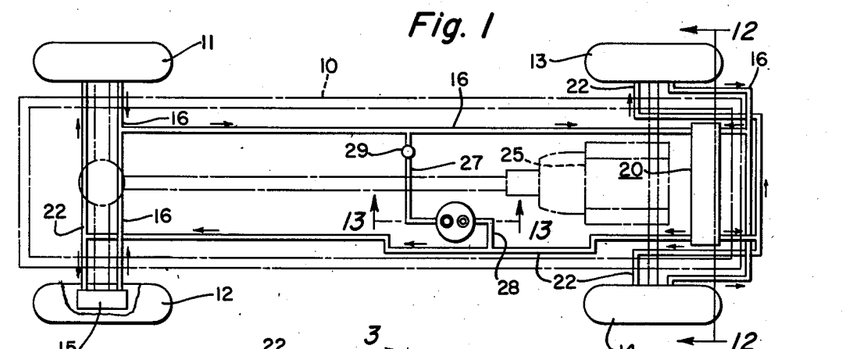
Figure 1 is a schematic view of a motor vehicle incorporating a brake cooling fluid circulating system in accordance with this invention.
Figure 2:
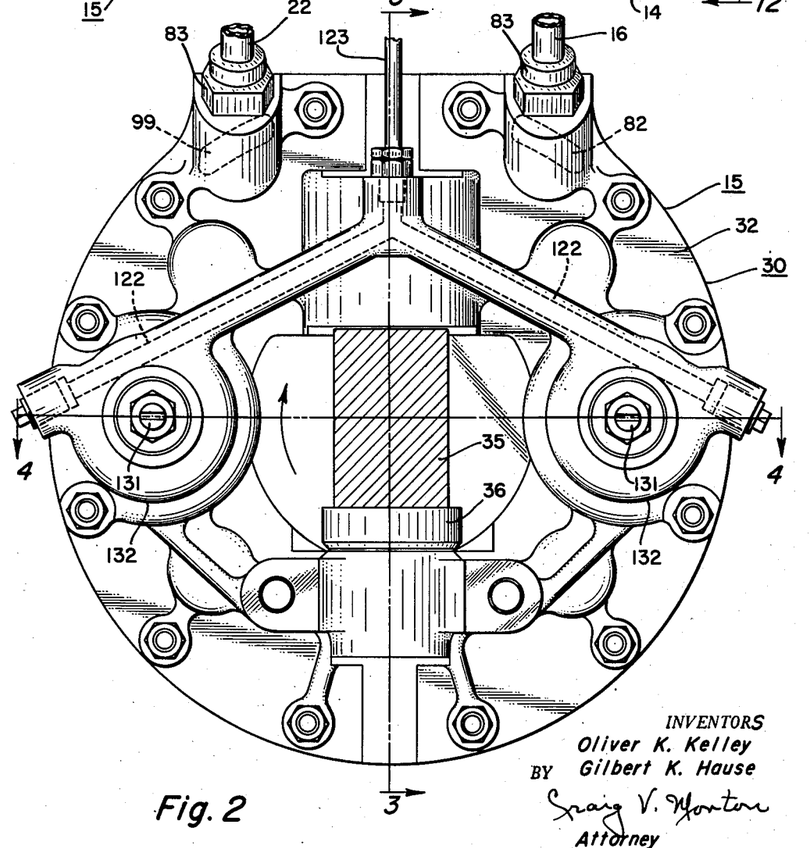
Figure 2 is a side elevational view of a brake structure incorporating features of the invention.

In Figure 1 there is illustrated schematically a motor vehicle incorporating a brake system and brakes of this invention. The motor vehicle comprises a frame 10 supported on the wheels 11, 12, 13 and 14. In each of the wheels there is provided a friction brake 15, more particularly illustrated and described with reference to the remaining figures of the drawings. In each of the brakes 15 there is provided a liquid circulating device, or pump, to cause a flow of circulating liquid through each of the brakes to remove heat generated as a result of engagement of the friction elements of the brake. Cooling liquid that has absorbed heat from the friction elements of the brakes is discharged into the conduits 16 that are connected with the inlet header 17 of a heat exchange device 18 (see Fig. 12) that is incorporated in the lower collecting chamber 19 of an engine radiator 20. The heat exchange device 18 has a discharge header 21 that connects by means of the conduits 22 with the suction side of a liquid circulating device, or pump, placed in each of the brakes 15.

The radiator 20 is connected with the engine 25 of the motor vehicle in conventional manner.

To provide for a reserve supply of liquid in the heat exchange system, a reservoir 26 is connected between the high temperature discharge line 16 and the low temperature return line 22 by means of the conduits 27 and 28. To prevent by-passing of the high temperature liquid from the discharge line 16 from the brakes 15, a pressure relief valve 29 is provided in the line 27 so as to maintain a higher pressure in the line 16 then in the return line 22. The pressure relief valve 29 may be set at any desired pressure level to obtain the desired flow of liquid in the heat exchange circulating system with auxiliary pressure relief to the reservoir 26 in the event the pressure in the discharge line 16 should rise to an unusually high value.

From the foregoing description it will be apparent that the high temperature liquid from all of the brakes 15 enters a common heat exchange system with the return line from the heat exchange system supplying the individual heat circulating device in the severally independent brakes 15 for independent volume flow through the brakes so that the flow in each of the brakes can be independently regulated to meet the heat removal requirement of the respective brakes.

Figure 3:
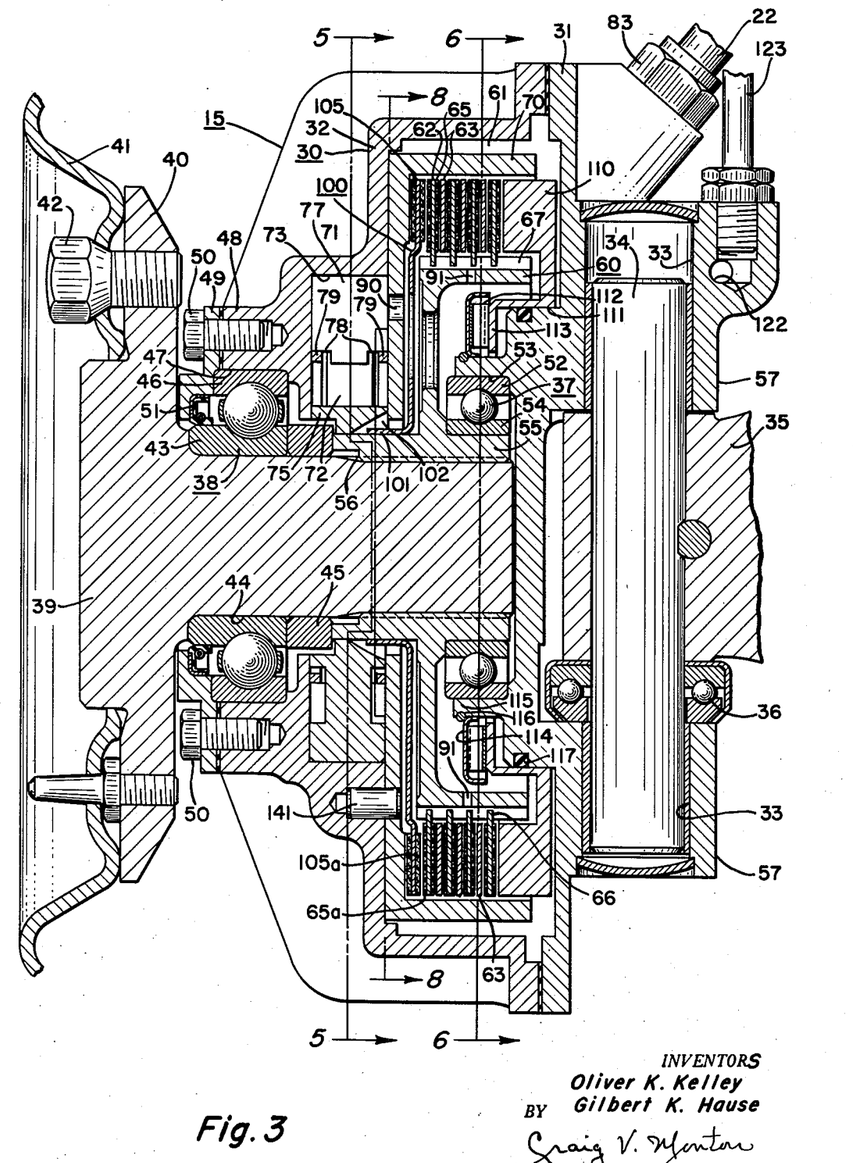
Figure 3 is a vertical cross sectional view of the brake structure taken along line 3—3 of Figure 2.

The brake 15 of this invention comprises a brake housing 30 that is composed of the brake housing member 31 and the brake housing member 32. The housing member 31 has a boss 57 having axial bores 33 therein that receive the kingpin 34 of the steering knuckle 35. The brake illustrated in the drawings is adapted for mounting on the front wheel of a vehicle. However, it is understood that the brake is also adapted for mounting on the rear wheel of a vehicle by proper modification of the housing 31.

The steering knuckle 35 supports the brake housing member 31 on an anti-friction thrust bearing 36.

The housing member 31 supports an anti-friction bearing 37 while the housing member 32 supports an anti-friction bearing 38, the bearings 37 and 38 supporting a wheel spindle 39. The wheel spindle 39 has a radial flange 40 that supports the wheel disk 41 of a wheel of a motor vehicle, the wheel disk 41 being secured to the spindle flange 40 by means of the stud bolts 42.

The anti-friction bearing 38 comprises an inner race 43 that is a press fit on the cylindrical portion 44 of the axle spindle 39 thereby retaining the bearing 38 in position on the axle spindle. A retaining ring 45 is also a press fit on the cylindrical portion 44 of the axle spindle 39 to aid in retaining the inner race 43 in position on the axle spindle.

The anti-friction bearing 38 has an outer race 46 that is received in a recess 47 in the wall 48 of the housing member 32. A retaining plate 49 is secured to the housing wall 48 by means of the bolts 50 to retain the outer race 46 in position in the housing wall 48.

The anti-friction bearing 38 is thus constructed and arranged to take radial thrust of the axle spindle 39 and also to take the axial thrust of the axle spindle 39 to prevent the spindle from pulling outwardly of the brake housing 30. An oil seal 51 is provided between the retaining plate 49 and the inner race 43 of the anti-friction bearing 38 to prevent loss of oil to the out-board side of the brake housing 30.

The in-board anti-friction bearing 37 has an outer race 52 that is carried in a recess 53 provided in the housing member 31. The inner race 54 of the inboard bearing 37 is supported upon the sleeve 55 of the brake disk carrier member 60. Brake disk carrier 60 has the internal periphery of the sleeve 55 splined to receive the spline 56 on the inboard end of the axle spindle 39 whereby the brake disk carrier 60 rotates with the axle spindle 39, the spindle 39 in turn being rotated by the wheel of the motor vehicle. The housing member 32 of the brake housing 30 has a chamber 61 that houses a friction brake composed of a plurality of alternately arranged rotatable friction disks 62 and stationary friction disks 63. The rotatable friction disks 62 are provided on opposite faces with annularly arranged friction member 65 that are formed of any suitable friction material adapted to engage the stationary friction plate 63 to perform the desired brake function to stop the rotation of the brake carrier 60 in the wheel of the vehicle.

The inner peripheries of the annularly arranged rotatable friction disks 62 are provided with the internal splines 66 that engage the splines 67 on the outer periphery of the carrier 60 whereby to effect rotation of the friction disks 62 with the carrier 60.

The stationary friction disks 63 are each provided with radially extending projections 68 that extend into axially extending slots 69 provided in the annular wall 70 that projects axially from the wall 71 that divides the housing member 32 into the brake chamber 61 heretofore described and the pump chamber 73.

The pump chamber 73 receives a pump rotor 75 that is carried upon the sleeve 55 of the brake carrier 60, and is freely rotatable on the sleeve 55. The pump rotor 75 has a plurality of radial slots 72 each of which carries a pump vane 77.

The pump vanes 77 are provided with shoulders 78 that are engaged by the annular rings 79 that retain the outer edges of the pump vanes 77 in engagement with the pump bore 73. The pump bore 73 is eccentric to the axis of the axle spindle 39, as shown in Fig. 5 to provide a pumping chamber 80 through which the pump vanes 77 pass.

Figure 7:
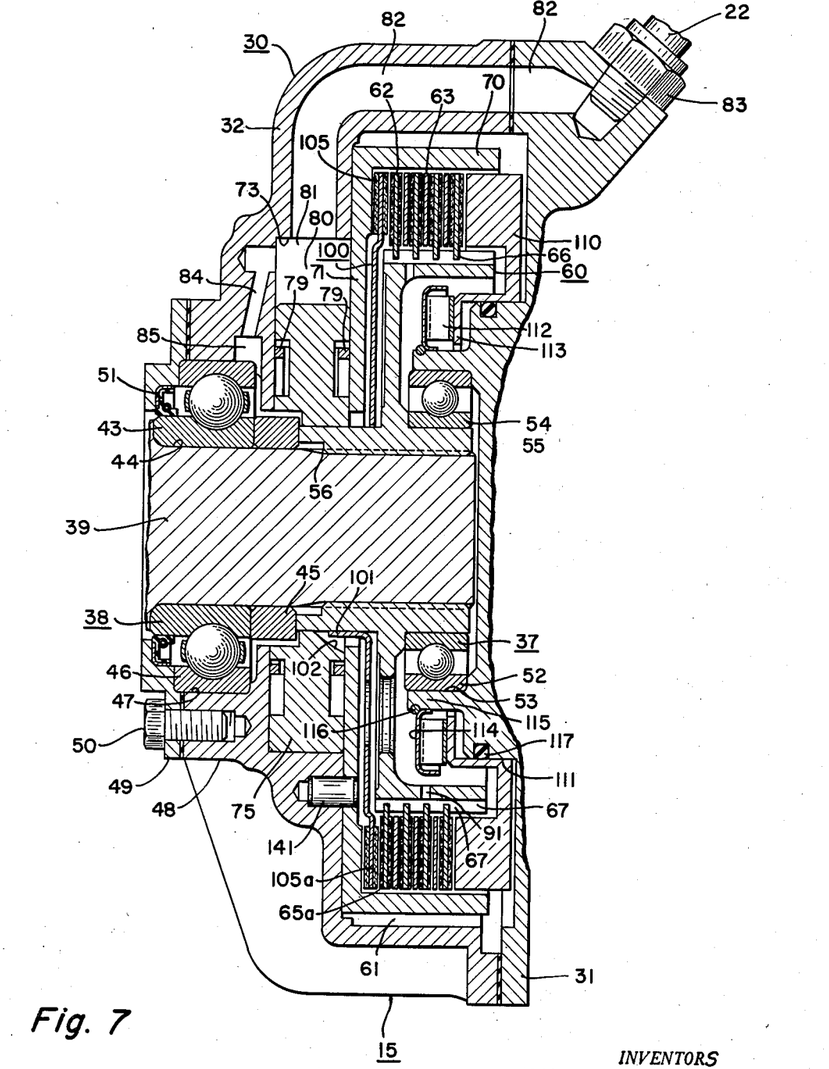
Figure 7 is a vertical cross sectional view taken along line 7—7 of Figure 5.

The pump bore 73 communicates with an inlet chamber 81 that has an inlet passage 82 connected therewith that extends through the pump housing members 32 and 31, as shown in Fig. 7. A suitable connection fitting 83 is provided at the end of the inlet passage 82 for connection with the inlet return line 22 of the heat exchange system illustrated in Fig. 1.

As shown in Fig. 7 the outboard anti-friction bearing 38 receives fluid for its lubrication through the passage 84 that connects the inlet passage 82 to the pump chamber 80 with a chamber 85 adjacent the outboard bearing 38.

Figures 5, 12, 13:
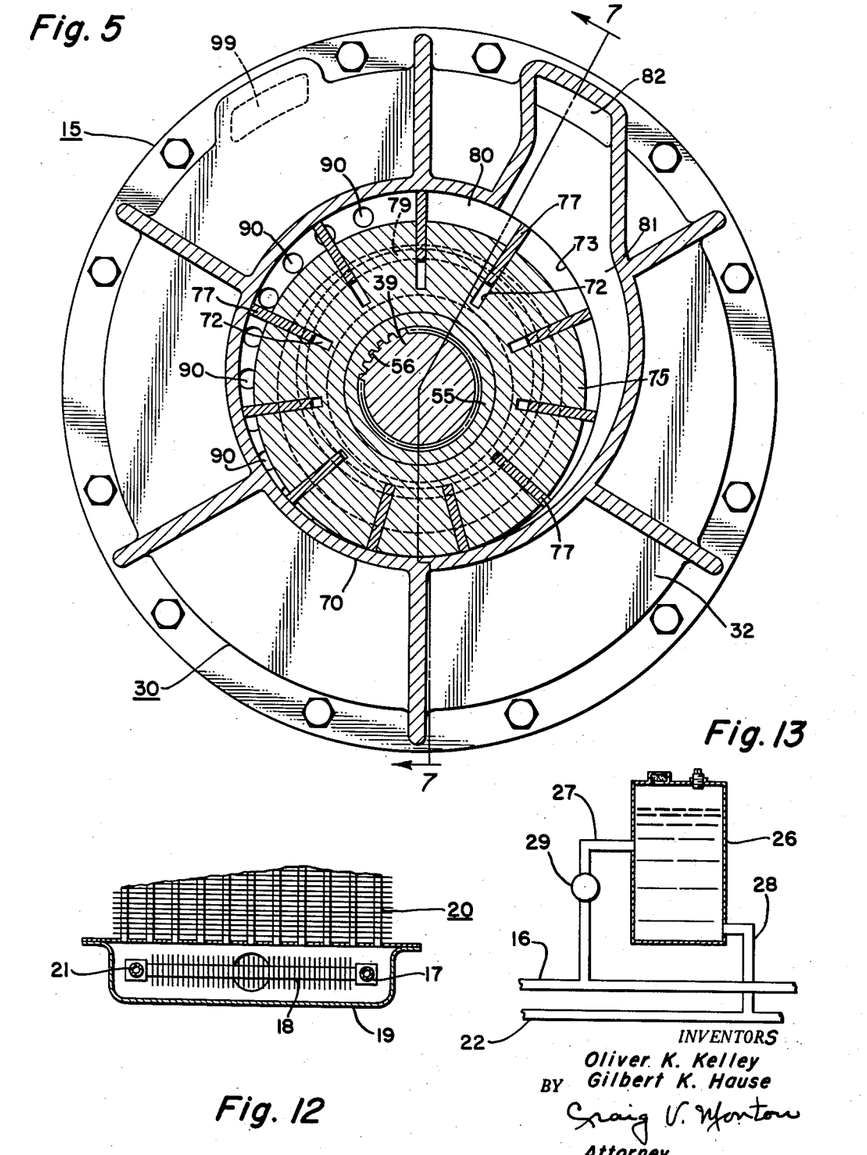
Figure 5 is a vertical cross sectional view taken along line 5—5 of Figure 3.
Figure 12 is a vertical cross sectional view of a heat exchanger for the liquid cooling system taken substantially along line 12—12 of Figure 1.
Figure 13 is a vertical cross sectional view taken along line 13—13 of Figure 1.

Liquid under pressure is delivered from the pump chamber 80 by rotation of the vanes in a counter-clockwise direction, as viewed in Fig. 5, a plurality of port passages 90 being provided in the wall 71 whereby fluid under pressure is delivered from the pump chamber 80 into the brake chamber 61.

Figure 11:
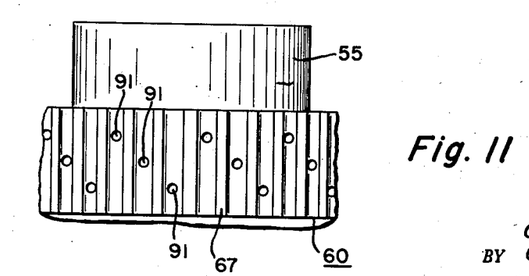
Figure 11 is a partial cross sectional view taken along line 11—11 of Figure 9 with the brake disks removed to illustrate the openings through which liquid is circulated to the brake disks.

The brake disk carrier 60 is provided with a series of openings 91, see Figures 3 and 11 through which fluid under pressure delivered into the chamber 61 is conducted through the carrier 60 for delivery to the inner peripheries of the brake disks 62 and 63.

Figure 6:
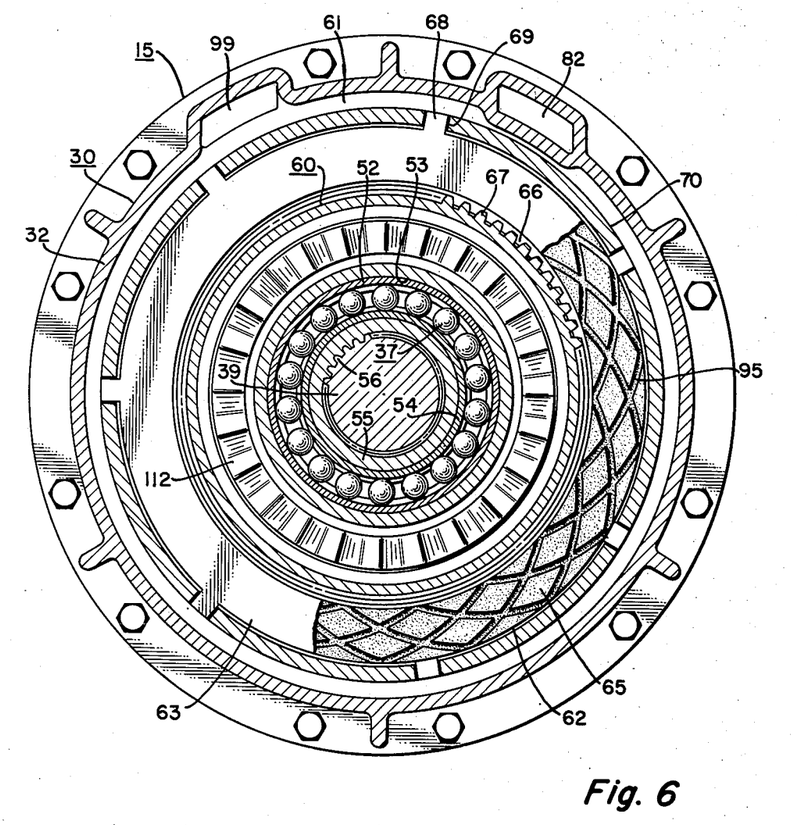
Figure 6 is a vertical cross sectional view taken along line 6—6 of Figure 3.

The friction facings 65 on the rotatable brake disks 62 are provided with a series of grooves 95, as shown in Fig. 6, whereby fluid delivered through the openings 91 in the carrier 60 may pass between the rotatable disks 62 and the stationary disks 63 when the brake disks are in engagement. The passages 95 in the friction facings 65 produce an interlaced pattern of grooves to effect a high degree of turbulence in the flow of liquid between the brake disks to obtain a scrubbing action on the brake disks during the flow of liquid between the disks and thereby provide for the maximum efficient absorption of heat from the brake disks.

The liquid discharging from the outer peripheries of the brake disks 62 and 63 enters the space between the wall 70 and the outer peripheries of the brake disks, and thereby communicates with the chamber 61. The chamber 61 is provided with a discharge opening 99 that connects with the high temperature discharge line 16 of the heat exchange circulating system illustrated in Fig. 1 whereby the heated liquid discharging from the brakes 15 is delivered to the heat exchanger 18 and then returned to the pump chambers of the respective pumps in the several brakes.

Figure 8:
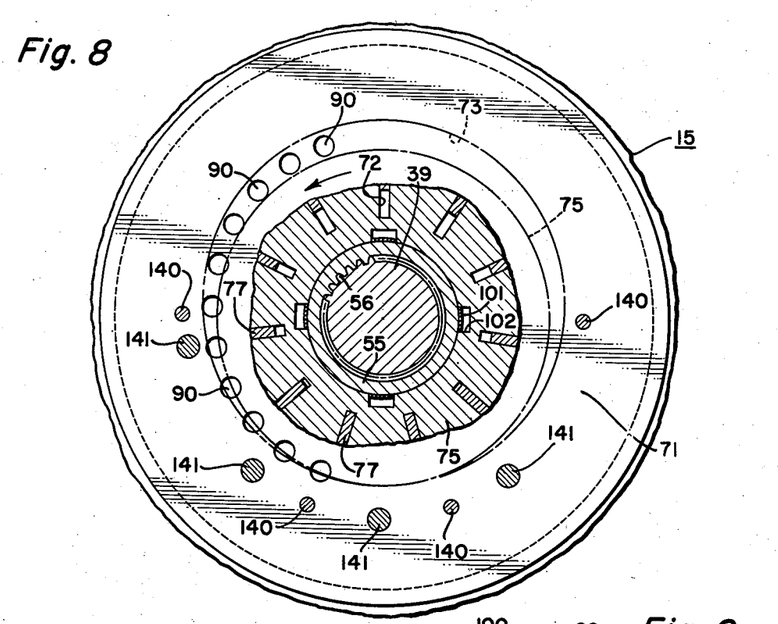
Figure 8 is a vertical cross sectional view taken along line 8—8 of Figure 3.

The pump rotor 75 is driven by a drive plate 100 that has axially disposed projections 101 extending into slots 102 in the inner periphery of the rotor 75, as shown in Figures 3 and 8 whereby the pump rotor 75 is keyed to the drive disk 100.

Figure 10:
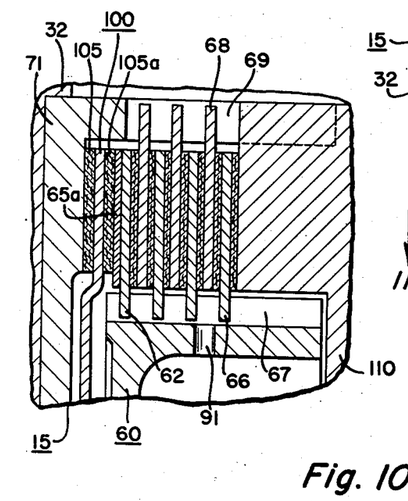
Figure 10 is a cross sectional view similar to Figure 9 showing the multiple disk brake in applied position.

The outer periphery of the drive disk 100 carries the friction members 105 on each of opposite sides thereof, the friction members 105 being aligned axially with the brake disks 62 and 63. Thus the outer periphery of the drive disk 100 becomes a cooperating part of the brake disk assembly that is engaged by the immediately adjacent rotating brake disk 62 when the brake is applied, as illustrated in Fig. 10. The friction member 105a of the drive disk 100 engages the friction member 65a on the rotatable brake disk 62. Thus the high degree of friction created between the friction members 105a and 65a effect a substantially positive coupling between the rotatable brake disk 62 and the drive disk 100, the coefficient of friction between the friction members 105a and 65a being substantially greater than the coefficient of friction of the friction member 105 on the opposite side of the drive disk 100 with the inner surface of the wall 71 when the brake disks are in engagement, as shown in Fig. 10, during a brake application. Thus, the drive member 100 rotates at the same speed as the rotatable brake disk 62 that is supported on the brake disk carrier 60 as driven by the axle spindle 39 to effect a driving of the drive disk 100 at substantially the same speed of rotation as the wheel of the vehicle.

Since the pump rotor 75 will be rotated at substantially the speed of the vehicle wheel, the volumetric displacement of the pump will be in direct proportion to the speed of the wheel of the vehicle, that is for each increment of speed of the vehicle wheel, and thus of the rotatable brake disks 62, there will be a comparable proportional increase in speed of the pump rotor and volume of liquid delivered from the pump.

The flow capacity of the pump is calculated so that the liquid delivered from the pump through the brake disks at a maximum predetermined speed with the brake disks in engagement under a predetermined applied pressure to effect a liquid flow sufficient to prevent a temperature rise of the brake disks above a predetermined value irrespective of the duration of the brake application. Thus the liquid flow through the brake disks is such that the heat generated during a brake application is carried away from the brake disks as rapidly as created in the brake disks.

Since the flow of cooling liquid through the brake disks is calculated to remove the maximum heat generated under maximum braking conditions, and since the speed of rotation of the pump is directly proportional to the speed of rotation of the wheel, in fact it may be the same speed, the pump will automatically effect the proper volume flow through the brake disks to remove heat from the brake disks at any lesser rate under less severe braking conditions.

The brake disks 62 and 63 are brought into brake engaging relationship with the rotatable brake disk 62 being brought into driving engaging relationship with the driving disk 105 by means of a pressure plate 110 that is supported on the cylindrical shoulder 111 on the housing member 31. The pressure plate 110 is retained in the position shown in Fig. 3 by means of a wave type annularly arranged retraction spring 112 that is placed between the radial flange 113 on the pressure plate 110 and a retaining ring 114 supported on the cylindrical shoulder 115 on the housing member 31. The retaining ring 114 is held in position by means of a snap ring 116. An O ring seal member 117 is placed between the pressure plate 110 and the cylindrical shoulder 111 to prevent loss of liquid under pressure from the brake chamber 61.

Figure 4:
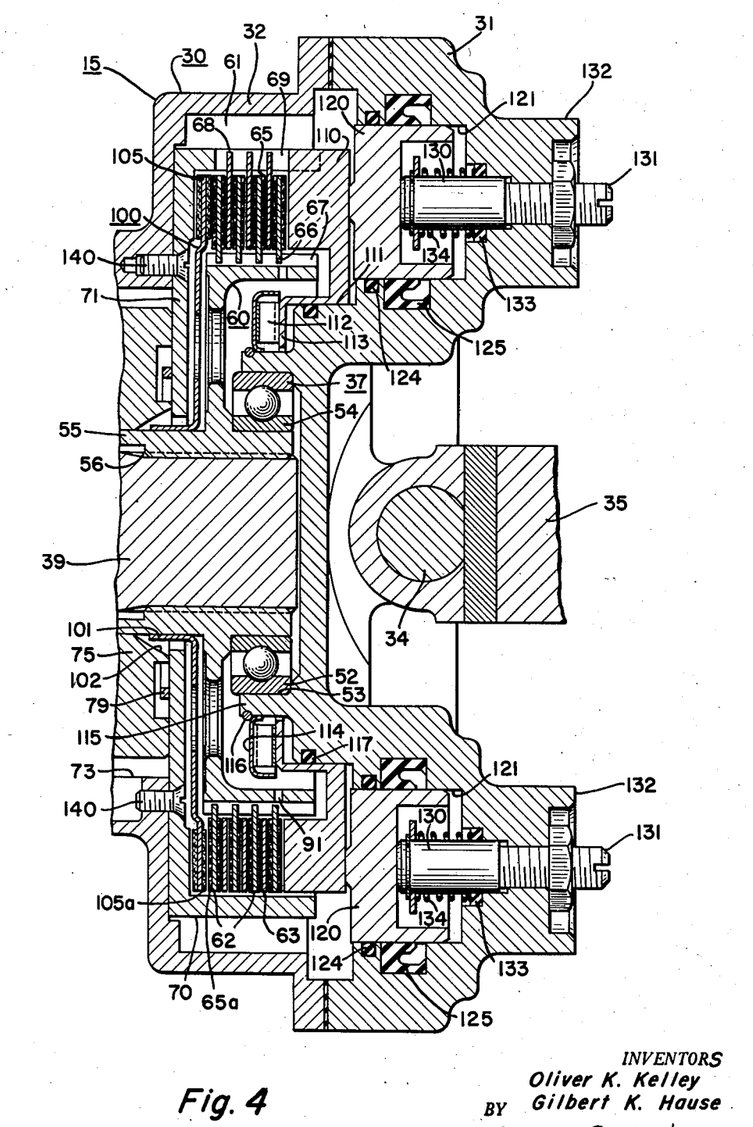
Figure 4 is a horizontal cross sectional view taken along line 4—4 of Figure 2.

The pressure plate 110 is actuated by means of a pair of hydraulically operated pistons 120 placed on diametrically opposite sides of the axis of the pressure plate 110, as shown in Fig. 4. The pistons 120 reciprocate in cylinders 121 that are connected with the master cylinder of a hydraulic brake system by means of the conduit passage 122 and the conduit 123. Delivery of hydrualic fluid under pressure into the cylinders 121 through the aforementioned conduits effects movement of the pistons 120 in a leftward direction as viewed in Fig. 4 to correspondingly move the pressure plate 110 and thereby urge the brake disks 62 and 63 into brake engaging relationship. Concurrently the rotatable brake disk 62 is moved into driving engagement with the drive disk 105 for the pump rotor 75 to effect actuation of the pump concurrently with initiation of the brake actuation.

Suitable seals 124 and 125 are provided between the pistons 120 and the cylinders 121 to prevent loss of brake fluid from the cylinders 121 or entry of cooling fluid into the brake cylinders from the brake chamber 61.

Figure 9:
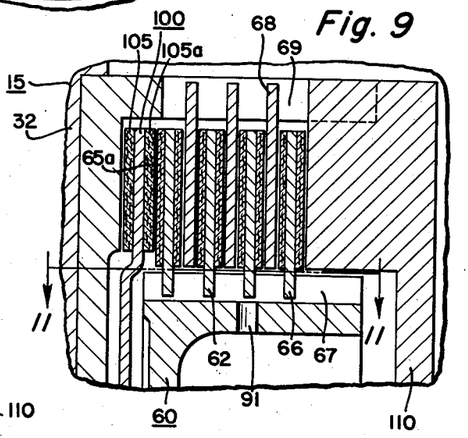
Figure 9 is an enlarged cross sectional view of the multiple disk brake illustrating it in restricted position.

Each of the cylinders 121 is provided with a stop member 130 that has a threaded stem 131 threadedly received in the boss 132 of the housing member 31. The stop member 130 may therefore be adjusted inwardly or outwardly of the brake cylinder 121 to adjust the position of the pressure plate 110 relative to the brake disks to provide the desired clearance between the disks 62 and 63 when the pressure plate is in the retracted position shown in Figures 4 and 9. A seal 133 is placed around the stop member 130 and is held under pressure by means of the compression spring 134.

The wall 71 that divides the housing member 32 into the brake chamber 61 and the pump chamber 80 is secured to the housing member 32 by means of fastening screws 140, pins 141 being provided to locate the wall 71 with reference to the pump chamber 80 to dispose the openings 90 in the wall 71 adjacent the discharge portion of the pump chamber 80, as shown in Figures 5 and 8.

While the form of embodiment of the invention as herein disclosed constitutes a preferred form, it is to be understood that other forms might be adopted as may come within the scope of the claims which follow.

What is claimed is as follows.

1. In a brake system on a multiple wheeled vehicle, the combination of, multiple wheels on a vehicle, each of said wheels having cooperating engageable stationary and rotatable means forming friction brake means for the respective wheels, liquid circulating means carried at each wheel to effect liquid circulation through the brake means for heat removal therefrom and normally inoperative during rotation of the wheel, and normally inactive drive means between each liquid circulating means and the rotatable means of the respective associated friction brake means drivingly engageable therewith concurrently with and by actuation of the respective friction brake means to drive thereby each of said liquid circulating means independently by the brake means during only brake actuation of the respective associated friction brake means.

2. In a brake system on a multiple wheeled vehicle, the combination of, multiple wheels on a vehicle, each of said wheels having cooperating engageable stationary and rotatable means forming friction means for the respective wheels, positive displacement liquid pump means carried in each wheel to effect positive volumetric flow through the brake means for heat removal therefrom and normally inoperative during rotation of the wheel, and normally inactive drive means between each of said pump means and the rotatable means of the respective associated friction brake means drivingly engageable therewith concurrently with and by actuation of the respective friction brake means to drive thereby each of said pump means independently by the brake means during only brake actuation of the respective associated friction brake means.

3. In a brake system on a multiple wheeled vehicle, the combination of, multiple wheels on a vehicle, each of said wheels having cooperating engageable stationary and rotatable means forming friction brake means for the respective wheels, positive displacement liquid pump means carried at each wheel to effect positive volumetric flow through the brake between the engageable means for heat removal therefrom and normally inoperative during rotation of the wheel, normally inactive drive means directly coupling each of said pump means to the rotatable means of the respective associated friction brake means during only the period the stationary and rotatable means are effective as friction brake means, to drive said pump means by said brake means at a speed in direct proportion to the speed of rotation of the rotatable means and thereby in direct proportion to the speed of rotation of the wheel to effect pump delivery through the respective brakes on the respective wheels in direct proportion to the individual brake effort required by each of the respective wheels, and a heat exchange circuit for liquid cooling common to all of said brake means.

4. In a brake system on a multiple wheeled vehicle, the combination of, multiple wheels on a vehicle, each of said wheels having cooperating engageable stationary and rotatable means forming friction brake means for the respective wheels, positive displacement liquid pump means carried at each wheel to effect positive volumetric flow through the brake between the engageable means for heat removal therefrom, drive means directly drivingly coupling each of said pump means to the rotatable means of the respective associated friction brake means during only the period the stationary and rotatable means are effective as friction brake means to drive said pump means at a speed in direct proportion to the speed of rotation of the rotatable means and thereby in direct proportion to the speed of rotation of the wheel to effect pump delivery through the respective brakes on the respective wheels in direct proportion to the individual brake effort required by each of the respective wheels, and a heat exchange circuit for liquid cooling common to all of said brake means receiving heated liquid delivered from the several brake means and returning cooled liquid severally to the pumps of the respective brake means for circulation independently through the severally independent brake means.

5. In a brake system on a multiple wheeled vehicle, the combination of, multiple wheels on a vehicle, each of said wheels having cooperating engageable stationary and rotatable means forming friction brake means for the respective wheels, positive displacement liquid pump means carried at each wheel to effect positive volumetric flow through the brake between the engageable means for heat removal therefrom and normally inoperative during rotation of the wheel, drive means between each of said pump means and the respective associated friction brake means normally inactive and drivingly engageable with the said rotatable means of the respective friction brake means by actuation of the brake means to drive thereby each of said pump means independently from the respective associated friction brake means, and a heat exchange circuit for liquid cooling common to all of said brake means including an engine radiator with a heat exchange device in the lower collecting chamber of the radiator receiving heated liquid delivered from the several brake means and returning cooled liquid severally to the pumps of the respective brake means for circulation independently through the severally independent brake means.

6. In a brake system on a multiple wheeled vehicle, the combination of, multiple wheels on a vehicle, each of said wheels including a housing enclosing cooperating engageable stationary and rotatable means forming friction brake means for the respective wheels, independently acting liquid circulating means disposed in each housing at each wheel to effect independent liquid circulation through the respective brake means between the said engageable means for heat removal therefrom, and drive means operably connecting each liquid circulating means with the rotatable means of its respectively associated friction brake means to drive thereby each of said liquid circulating means independently by the respective friction brake means during only the period the friction brake means is effective.

7. In a brake system on a multiple wheeled vehicle, the combination of, multiple wheels on a vehicle, each of said wheels including a housing enclosing cooperating engageable stationary and rotatable brake disks forming friction brake means for the respective wheels, independently acting liquid circulating means disposed in each housing at each wheel to effect independent liquid circulation through the respective brake means between the said disks for heat removal therefrom, and a drive disk in each of the respective brakes operably connected with said liquid circulating means to operate the same and engageable by one of the rotatable brake disks to drive said drive disk and thus said circulating means by the rotatable brake disk.

8. In a brake system on a multiple wheeled vehicle, the combination of, multiple wheels on a vehicle, each of said wheels including a housing enclosing cooperating engageable stationary and rotatable brake disks forming friction brake means for the respective wheels, independently acting liquid circulating means disposed in each housing at each wheel to effect independent liquid circulation through the respective brake means between the said disks for heat removal therefrom, and a drive disk in each of the respective brakes operably connected with said liquid circulating means to operate the same and engageable by one of the rotatable brake disks to drive said drive disk and thus said circulating means by the rotatable brake disk, the engagement of said drive disk by said rotatable disk effecting a driving coupling therebetween to drive said liquid circulating means at speeds directly proportional to the speed of rotation of the rotatable brake disk.

9. A brake system in accordance with claim 8 in which the liquid circulating means comprises a positive displacement pump to effect positive liquid displacement between the brake disks in direct proportion to the driving speed of the rotatable brake disk and thereby in direct proportion to the brake effort required of the brake disk.

10. A brake system in accordance with claim 9 in which liquid circulated through the several brakes discharges into a common heat exchange system for cooling of circulating liquid and the cooled liquid is returned to the severally independently acting pumps for independent circulation through the severally independent brakes for volumetric flow through the severally independent brakes in direct proportion to the independent brake effort of the severally independent brakes.

11. A liquid cooled friction brake, comprising in combination, cooperating engageable stationary and rotatable disks forming friction brake means, a normally inactive positive displacement pump for effecting liquid circulation when active through the brake between the engageable means for heat removal therefrom, and a drive disk included as one of the disks of the friction brake means drivingly connected with said pump and drivingly coupling said pump with a rotatable disk of the friction brake means concurrently with engagement of the stationary and rotatable friction brake disks to drive thereby said pump at a speed proportional to the speed of the rotatable brake disks to render the pump active to full circulation of liquid between the engaged stationary and rotatable friction brake disks volumetrically in direct proportion to the speed of the rotatable disks for the period of engagement of the friction brake disks.

12. A liquid cooled friction brake, comprising in combination, a housing enclosing engageable stationary and rotatable disks forming friction brake means, a normally inactive liquid circulating means disposed in said housing adjacent said brake disks for effecting liquid circulation through the brake between the brake disks for heat removal therefrom, and a normally stationary but freely rotatable drive disk positioned immediately adjacent a rotatable brake disk in the brake disk assembly and drivingly engageable by the rotatable brake disk, said drive disk being drivingly connected to said liquid circulating means to render the same active for circulation of liquid only concurrently with brake engagement of the said friction brake disks.

13. A liquid cooled friction brake, comprising in combination, a brake housing enclosing engageable stationary and rotatable disks forming friction brake means, a normally inactive liquid pump disposed in said housing to effect liquid circulation when active through the brake disks to effect a heat removal therefrom, a drive disk drivingly connected with said pump, said drive disk being normally inactive and having the periphery thereof positioned immediately adjacent a rotatable brake disk in the brake disk assembly for driving engagement thereby, said drive disk being drivingly coupled to said rotatable brake disk only during the period of brake engagement of the friction brake disks to drive said pump thereby only during brake action.

14. A liquid cooled friction brake, comprising in combination, a brake housing, said housing having a transversely extending wall, a plurality of engageable stationary and rotatable disks forming friction brake means disposed in said housing on one side of said wall, a liquid pump disposed in said housing on the opposite side of said wall, and a freely rotatable drive disk drivingly connected with said pump and disposed immediately adjacent a rotatable brake disk in the brake disk assembly for driving engagement thereby concurrently with brake engagement of the stationary and rotatable brake disks.

15. A liquid cooled friction brake in accordance with claim 14 in which the said drive disk and the rotatable friction disk to which it is adjacent are both faced with a friction material to provide for friction engagement of the friction faced drive disk with the friction faced rotatable brake disk to effect a positive drive coupling between the said rotatable friction brake disk and the said drive disk.

References Cited in the file of this patent

UNITED STATES PATENTS

| | | |
|---|---|---|
| 2,226,457 | Whittingham | Dec. 24, 1940 |
| 2,378,100 | Pogue | June 12, 1945 |
| 2,406,304 | Levy | Aug. 20, 1946 |
| 2,471,858 | Bloomfield | May 31, 1949 |
| 2,659,468 | Hobbs | Nov. 17, 1953 |